Patented Mar. 9, 1948

2,437,421

UNITED STATES PATENT OFFICE 2,437,421

VULCANIZABLE COPOLYMERS OF ACRYLO-NITRILE, BUTADIENE, AND VINYL ETHERS

Gaetano F. D'Alelio, Northampton, Mass., assignor to Pro-phy-lac-tic Brush Company, Northampton, Mass., a corporation of Delaware No Drawing. Application February 25, 1944, Serial No. 523,900

7 Claims. (Cl. 260—84.5)

This invention relates to new polymerization products and the discovery that a mixture of a butadiene-1,3, an acrylonitrile and a monovinyl ether can be copolymerized to form novel copolymerization products which are heat convertible and vulcanizable. Useful articles can be formed from these copolymers by molding, extrusion, or calendering. The properties of these new copolymers depend upon the relative proportions of the ingredients from which they are made. Thus, it is possible to prepare rubber-like compositions when the butadiene is the major component or resinous compositions when the acrylonitrile is the major component. The monovinyl ether appears to serve as an internal plasticizer.

When an acrylonitrile is used in an amount of about 35 percent or more, the resulting copolymer has a high softening point and is difficult to process by customary methods. In such cases, the copolymer may be processed by the method described and claimed in my copending application, Serial No. 523,901 filed Feb. 25, 1944 now U. S. Patent No. 2,425,086. The process described in that application comprises forming a workable cohesive gel of the copolymer by mixing with certain liquids, such as nitromethane. If a vulcanizable composition is desired, the vulcanizing ingredients may be incorporated in the gel. The gel may be shaped to any predetermined form by extrusion, calendering or the like. Certain of these copolymers may also be improved as to physical properties by cold drawing according to the methods explained and claimed in said application.

In the practice of the invention, I may use a butadiene-1,3 having the formula

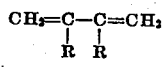

wherein R is a hydrogen or a hydrocarbon radical, for example, methyl, ethyl, propyl, butyl, isobutyl, amyl, isoamyl, hexyl, cyclopentyl, cyclohexyl, methyl cyclohexyl, phenyl, tolyl. R also may be a chlorine substituted hydrocarbon, such as chlortolyl, chlorphenyl, etc.

Specific examples of the 1,3-butadienes are butadiene-1,3 itself; 2-methyl butadiene-1,3; 2,3-dimethyl butadiene-1,3; 2-methyl pentadiene-1,3 (2,4-dimethyl butadiene-1,3); 2-phenyl butadiene-1,3; 2,3-diphenyl butadiene-1,3; pentadiene-1,3; etc.

In the practice of the invention I may use an acrylonitrile of the structure $$CH_2=CRCN$$

wherein R is hydrogen or a methyl radical.

The monovinyl ethers used in the practice of this invention possess the general formula $$CH_2=CH-OR'$$

wherein R' represents the residue of a monohydroxy alcohol; the only requirement of the alcohol is that it is devoid of ethylenic and acetylenic unsaturation.

As examples of alcohols from which the ethers may be prepared, I may use methyl, ethyl, propyl, isopropyl, butyl, isobutyl, amyl, secondary amyl, isoamyl, mixed amyl, hexyl, cyclopentyl, cyclohexyl, methyl cyclopentyl, methyl cyclohexyl, benzyl, phenethyl, chloroethyl, acetoxyethyl, methoxyethyl, ethoxyethyl, butoxyethyl, phenoxyethyl, chlorphenoxyethyl, acetoxypropyl, methoxypropyl, ethoxypropyl, phenoxypropyl, carbalkoxyethyl, etc., alcohols. The term monovinyl ethers as hereinafter used, refers to the ethers of monohydric alcohols as mentioned above and does not embrace unsaturated ethers possessing another polymerizable ethylenic or acetylenic group. Vinyl ethers containing 2 to 6 carbon atoms in the R group are to be preferred.

I am also aware that copolymers of acrylic nitriles with monovinyl ethers have previously been known. As a typical example, mention may be made of the acrylonitrile-vinyl ethyl ether copolymers. These copolymers are thermoplastic, non-vulcanizable compositions which possess the structure according to the reaction as follows:

where the numerical values of "n" and "m" depend on the mol ratios used. Such copolymers are thermoplastic and soluble and as far as I have been able to ascertain have not been converted to the insoluble, infusible state. Furthermore, such copolymers are prepared with extreme difficulty.

Copolymers of vinyl ethers and 1,3-dienes are also difficult to prepare, and in fact, when attempts are made to copolymerize low quantities of vinyl ether, of the order of 10 to 40%, with butadiene, the vinyl ether exhibits an inhibiting effect on the polymerization of the butadiene.

I am likewise aware that copolymers of acrylonitrile and butadiene are known. However, in many respects, these copolymers are not satisfactory, as in the difficulty encountered in processing the copolymer, and in that the material is inferior to other natural and synthetic resins at low temperatures. Many of these difficulties are either lessened or eliminated by the practice of this invention.

In view of the above chemical reactions, it is surprising that tripolymers of predetermined composition can be prepared when the polymerizable ingredients of a mixture comprise a diene-1,3; an acrylic nitrile; and a monovinyl ether.

Many advantages accrue to the practice of my invention. By its use it is possible to prepare internally plasticized synthetic rubber compositions when the butadiene component is in the major proportion, thereby contributing added properties to an acrylonitrile-butadiene polymer by a direct copolymerization process with a vinyl ether. This is evidenced by the greater ease with which the copolymer of acrylonitrile, vinyl butyl ether, and butadiene is processed as compared to a similar composition from which the ether had been omitted.

On the other hand, it is possible through the use of this invention to prepare vulcanizable plastic compositions, as for example, when the acrylonitrile component is in the major proportion. Such compositions are truly resin-like since they are capable of being molded without the addition of plasticizers; they are not rubber-like since they are amenable to mechanical working, such as punching and drilling.

If so desired, they may likewise be cured with vulcanizing agents, thereby increasing their solvent resistance and their toughness. Such compositions possess greater ductility than the corresponding composition of acrylonitrile and butadiene from which the ether has been omitted in the polymerization process.

It is thereby seen that the compositions of this invention possess a greater utility than it is possible to achieve by polymerizing separately (1) the acrylonitrile with the butadiene, (2) the acrylonitrile with the vinyl ether, or (3) the vinyl ether with the butadiene. Example 1 indicates the wide range of polymers that may be obtained in the practice of this invention.

The objects of this invention are achieved by emulsion polymerization of a mixture comprising the ratios of 30 to 90 parts of the acrylonitrile; 2 to 70 parts of the butadiene-1,3; and 2 to 40 parts of a monovinyl ether. Depending on the proportions of the ingredients used, compositions suitable as (1) synthetic rubbers or (2) molding compounds which may be used directly in the preparation of molded parts or further treated with vulcanizing or curing agents, are readily prepared.

When prepared by the non-aqueous polymerization methods in conjunction with alkali metal catalysts such as sodium, potassium, calcium, sodium triphenyl methyl, etc., catalysts, the products are not entirely satisfactory since such catalysts cause a considerable portion of the butadiene to cross link whereby the butadiene behaves as a divinyl instead of reacting according to the 1,4-addition. When the dienes are polymerized by alkali metals in the presence of unsaturated ethers having an olefinic double bond in the molecule, these ethers behave more in the function of diluents and as controlling media rather than as co-reactants as is evidenced by the fact that when high quantities of olefinic ethers, for example, vinyl ethers are used, all or a substantial portion of the unsaturated ether is recovered. This is so evidenced by the fact that dioxane, the acetals, furane, hydrogen cyanide, ethyl propenyl ether, allyl ethyl ether, benzyl cyanide, and methyl acetylene produce the same results. (See "The Chemistry of Synthetic Resins," by Carleton Ellis and United States Patent No. 2,008,491.)

The internal plasticizing effect of the monovinyl ether is sufficiently high that no particular advantage appears to accrue from the use of higher quantities. Higher quantities of vinyl ether may act as a retarder of polymerization.

Any suitable method may be used for the preparation of the polymers of this invention; however, emulsion methods are preferred. When the synthetic resins are prepared by emulsion polymerization, any substance may be used as the emulsifying agent which, when dispersed in water containing the polymerizable and other ingredients, is capable of producing a permanent dispersion of the reactive ingredients in water. The most suitable dispersion or emulsifying agents are those which give stable emulsions throughout the course of the polymerization.

Additional examples of emulsifying agents besides the potassium oleate used in Example 1 are Ivory soap, the sodium salts of sulfonated long-chain alcohols, the water-soluble salts of sulfosuccinic esters, N-stearyl betaine, cetyl trimethyl ammonium bromide, soluble lignin sulfonic acid salts, C-cetyl betaine, etc. Usually a 2 to 4% solution of an emulsifying agent in water is suitable in the preparation of a good dispersion, but a range of 0.2% to 10% may be used when a weaker or stronger solution is desired.

Many of the polymers of this invention may likewise be prepared in granular form and in this case agents are used which have relatively poor dispersing properties whereby they form nuclei for the formation of granules of the tripolymers. Such agents are usually called granulating agents and this process may be defined as the method of preparing these copolymers in granular form which comprises dispersing the polymerizable mixture in water by means of a protective colloid and polymerizing the mixture under agitation. The concentration of the granulating agent or protective colloid is adjusted so that it is not substantially greater than the amount of agent sufficient to maintain the polymerizable mixture in the dispersed phase while agitation is maintained and sufficient to prevent adhesion or coagulation of the dispersed particles during the polymerization process.

Examples of such protective colloids and granulating agents are soluble starch, methyl starch, polyvinyl alcohol, partially hydrolyzed polyvinyl acetate, gelatin, sodium halogenate soluble salts of cellulose, glycolate soluble salts of starch, glycol soluble salts of polyvinyl alcohol glycolate, polymethacrylic acid, natural gums, etc.

Usually a concentration of 0.1 to 1% of a granulating agent in water is satisfactory. The quantities, however, are adjusted to the dispersing power of the protective colloid.

As catalyst for the polymerization I may use any effective oxygen liberating agent such as benzoyl peroxide, sodium persulfate, potassium persulfate, sodium perborate, potassium perborate, hydrogen peroxide, stearyl peroxide, hyperperoxides, etc. In general, between 0.1 and 1.5% of catalyst are used depending on the nature of the catalyst and upon the desired rate of polymerization.

The course of polymerization of the monomeric mixture used in the properties of the polymers of this invention may be modified considerably by the presence of other ingredients used to modify or control the reaction. Thus, I may use small amounts of sulfur; hydroquinone; copper, naphthyl amine; carbon tetrachloride; pyrogallol; the higher mercaptans; the thiurams; the dithiurams; ferrous and ferric salts such as the tartrates, citrates, lactates; finely dispersed metals; halogenated amides; etc.

The ratio of the dispersed phase, that is, the mixture of the polymerizable monomers, to the water used with the emulsifying agent or protective colloid as the dispersing phase, may be varied widely. Satisfactory results are obtained in the range of 100 parts of monomer mixture to 100–500 parts of the dispersing phase. Auxiliary organic solvents such as dioxane, ethyl alcohol, glycols, benzene, etc. may likewise be used in the presence of the dispersed and dispersing phases. These ingredients may be added directly to the polymerizable mixture or may be present as diluents in the reacting ingredients. Thus, the butadiene, as prepared by the catalytic dehydrogenation of the butenes, may contain some butane as well as some butene-1 and butene-2. Likewise, the acrylonitrile may contain definite quantities of lactonitrile or methacrylonitrile. The monovinyl ether may likewise contain small quantities of alcohol.

The fundamental resins of this invention likewise may be modified by other polymerizable monomers containing a single ethylenic polymerizable double bond. Illustrative examples of such compounds are the vinyl halides, e. g., vinyl chloride; the vinylidene halides, e. g., vinylidene chloride, vinylidene fluorochloride, etc.; the esters of acrylic acid, e. g., methyl acrylate, ethyl acrylate, ethyl methacrylate, methyl methacrylate, methyl chloracrylate, fluorophenyl acrylate, etc.; the substituted aryl ethylenes, e. g., bromotoluyl ethylene, etc.; the vinyl esters, e. g., vinyl acetate, vinyl propionate, vinyl butyrate, vinyl benzoate; the nitrile derivatives of acrylic and methacrylic acid, e. g., acrylonitrile, methacrylonitrile, etc.; methylene malonic esters; the monoalkyl esters, e. g., the methyl ester; the diesters, e. g., the dimethyl ester, the dipropyl ester, etc.; the allyl derivatives, e. g., acrolein, methacrolein, vinyl methyl ketone, vinyl ethyl ketone, allyl chloride, dimethyl maleate, diethyl maleate, diethyl fumarate, allyl phenyl ether, allyl acetate, allyl propionate, allyl benzoate, etc.

In any of the above polymerization methods, the reaction may be carried out conveniently at 45° to 50° C. within a few days depending on the composition of the ingredients, the amount of catalyst, etc. It is possible with higher catalyst concentrations or with increased temperatures to decrease the reaction time to five to seven hours.

When the gaseous derivatives of butadiene-1,3 are used, the higher temperatures are to be avoided. The choice of the polymerization temperature, as is readily seen, depends on the choice of ingredients, of catalyst, of ratio of the dispersed to the dispersing phases, and the type of equipment employed.

The emulsified or dispersed polymers may be coagulated by any of the methods applicable to the dispersed polymer relative to the particular emulsifying or dispersion agent used. In many cases solutions of aluminum sulfate are satisfactory when added slowly and with stirring. Sodium chloride solutions, preferably those containing free acids such as sulfuric, hydrochloric, or acetic acid, are preferable because of low cost. Alternately, the emulsion may be broken by freezing or heating, thereby eliminating the addition of foreign or electrolytic material to the polymer. In many cases the addition of a lower alcohol such as methyl or ethyl alcohol satisfactorily breaks the emulsion.

In the ordinary method of producing granular polymers, precipitants are not usually required, but should a small amount of emulsion be obtained with the granular product, the resin contained in the emulsion may be precipitated by any of the means mentioned above.

In many cases where films or molded products of the copolymers of this invention are to be used unvulcanized and are required to withstand prolonged aging, it is desirable to add a small amount of antioxidant to such compositions containing high amounts of acrylic nitrile which are intended for use as unvulcanized thermoplastics.

It is obvious that the compositions of this invention made with high quantities of butadiene should likewise be compounded with antioxidants and inhibitors to give them strength before their use in producing vulcanized products.

As suitable oxidation inhibitors may be mentioned N-phenyl beta naphthyl amine, hydroquinone, eugenol, and similar substances, the amount needed being small, of the order of 0.1 to 2% of the weight of the interpolymer.

Many of the copolymers of this invention, are soluble in the nitrohydrocarbon solvents and, as such, are well adapted as film-forming materials, etc. These solutions may be used with or without vulcanizing or curing agents. When made in suitable equipment and under favorable conditions, the films are practically colorless. Furthermore, they are strong, tough, and flexible. Adhesion of these films to base materials such as wood, metal, glass, and the like is excellent. Such unpigmented solutions are useful as clear varnishes, lacquers, coating compositions, adhesives, etc., whereas the pigmented solutions are suitable for coating compositions such as paints, and pigmented lacquers for wood, metal, paper, leather, cloth, cork, asbestos board, etc.

Unpigmented copolymer solutions or emulsions of the copolymer are suitable for impregnating or coating papers and textiles, cellular and other fibrous bodies, and porous or semi-porous materials to contribute to their strength, toughness, imperviousness to moisture, flexibility, etc.

The molding compositions prepared from such bodies, particularly those of a plastic nature rather than a rubber-like nature possess the ability to withstand bending pressures when such pressure is applied slowly. These tripolymers are ideally suited for the preparation of articles that are usually subjected to bending strains such as in combs, or wiring of electrical equipment, panel boards, leather, etc.

The polymers of this invention containing in general 50 or more percent of butadiene in the copolymer are rubber-like while the polymers containing less than 50% of butadiene are of the nature of ductile synthetic resinous compositions capable of being vulcanized in the usual fashion to yield cured compositions with increased heat and solvent resistance.

For example, a rubber-like composition may be made by copolymerizing a mixture of about 30 to 40 parts of an acrylonitrile, 55 to 70 parts of a butadiene-1,3 and 2 to 10 parts of a monovinyl ether, while a resin-like product may be made by copolymerizing a mixture of about 50 to 90 parts of an acrylonitrile, 2 to 30 parts of a butadiene-1,3 and 2 to 40 parts of a monovinyl ether.

The compatibility of these new compositions with plasticizers is higher than that of the normal acrylonitrile-butadiene composition. This is attributed to the fact that the ether which has interpolymerized with the other ingredients, offers wider possibilities in the selection of suitable plasticizers.

Among the plasticizers suitable for use in this invention are dimethyl phthalate, diethyl phthalate, tricresyl phosphate, dibenzyl sebacate, dibutyl sebacate, diethylene glycol dihexoate, dibutoxyethyl sebacate, dicrotyl azeleate, tributyl citrate, chlorinated diphenyls, triacetone, tetraethylene, octyl phthalate, cyclohexyladipate, benzyl borate, dibenzyl ether, octyl chlorbenzoate, glycerol trilevulinate, ethylene glycol butyl phthalate, tetrahydrofurfuryl sebacate, tetrahydrofurfuryl fumarate, tributyl aconitate, etc. A wide variety of plasticizers may be used because of the solvation effect of the ether in the tripolymer.

The fundamental resins of this invention may be likewise compounded with other synthetic resins and other synthetic rubbers. They may be blended with the unsaturated alkyl resins, plasticized polyvinyl chloride resins, the polyvinyl acetal resins, with pigments, fillers, dyes, lubricants, softeners, etc.

The vulcanization of these polymers may be accomplished in the standard method of vulcanizing natural or synthetic rubber with or without reenforcing agents such as carbon black, etc.

As accelerators in conjunction with sulfur, there may be used the aldehyde amines, the guanidines, the carbon disulfide derivatives or mixtures of such materials. Some typical examples are heptaldehyde-aniline, butyraldehyde butyl amine, diphenylguanidine, di-o-toluylguanidine, triphenylguanidine, zinc dimethyl dithiocarbamate, zinc dibutyl dithiocarbamate, tetramethyl thiuram disulfide, tetramethyl thiuram monosulfide, mercapto benzothiazole, zinc mercaptobenzothiazole, benzothiazole disulfide, etc.

These materials may also be vulcanized without sulfur through the use of nitro compounds and organic peroxides such as trinitrobenzene, tetranitronaphthylene, benzoyl peroxide, a mixture of benzaldehyde and mercuric oxide, halogenated benzoquinones, benzoquinone dioxime, etc.

Other fillers and reenforcing agents and diluents may be used, such as wood flour, cotton flock, alpha flock, mica, asbestos, silica, powdered quartz, bagasse, lignocellulose, hydrolyzed wood, magnesium oxide, magnesium carbonate, clay, lithopone, limestone, etc.

In order that those skilled in the art better may understand how the present invention may be carried into effect, the following examples are given by way of illustration but not by limitation.

*Example 1*

The following compositions are suitable for emulsion polymerization using the ratio of 25 parts of polymerizable monomer to about 50 parts of 5% potassium oleate solution in distilled water. As polymerization catalyst there is used 0.25 part of potassium persulfate in the presence of 0.5 part of steel wool as an activator and moderator of the reaction. The polymerizable mixture is introduced into pressure vessels and reacted at 50° C., for at least 12 hours. An oxidation inhibitor, namely, N-phenyl beta naphthyl amine, is added to the resulting latex before precipitation with an aqueous 5% sodium chloride solution containing 2% sulfuric acid. The granulated polymers are washed free of soluble material, dried in a vacuum oven, and milled on rolls. The ratio of the polymerizable components is given in the following table:

| Specimen | Acrylonitrile | Vinyl Butyl Ether | Butadiene |
|---|---|---|---|
| A | 30 | 10 | 60 |
| B | 40 | 10 | 50 |
| C | 50 | 10 | 40 |
| D | 60 | 10 | 30 |
| E | 60 | 20 | 20 |
| F | 60 | 30 | 10 |
| G | 70 | 15 | 15 |
| H | 80 | 5 | 15 |
| I | 80 | 10 | 10 |
| J | 80 | 15 | 5 |

All of the above polymers were vulcanizable even those containing small quantities of butadiene. The types of polymer obtained are:

| Specimen | Characteristics |
|---|---|
| A | Rubbery, very elastic, high elongation. |
| B | Rubbery, less elastic than A. |
| C | Ductile, vulcanizable which yields readily on bending |
| D | Similar to C but less yielding. |
| E | Similar to C. |
| F | Tough, more yielding than E. |
| G | Tough, more ductile than F. |
| H | Tough, harder than G. |
| I | Very tough, harder than H. |
| J | Tough, softer than and similar to I. |

*Example 2*

Vulcanized products of high utility are obtained by processing samples B, D, E and F using the following as the ratio of components:

| | Parts |
|---|---|
| Tripolymer | 100 |
| Carbon black | 25 |
| Zinc oxide | 5 |
| Benzothiazyl disulfide | 2 |
| Sulfur | 2 |
| Stearic acid | 1 |

These compounds were cured at 130° C. for 30 minutes.

In compositions containing 40% or more of acrylonitrile, compounding of the copolymers may be accomplished by gelling the copolymers with nitromethane as described in my copending application, Serial No. 523,901, filed Feb. 25, 1944, now U. S. Patent No. 2,425,086 which is removed before molding. The products varied from rubbery bodies to hard, tough molded specimens. Introduction of the vulcanizing ingredients may be accomplished by introducing these ingredients into the latex prior to precipitation.

*Example 3*

A varnish solution of tripolymer of specimen J is prepared by dissolving the tripolymer in benzene to give a 20 to 30% solution and adding one part of benzothiazyl disulfide and two parts of sulfur. This varnish solution is used directly as a vulcanizable coating for wood, glass, and as an impregnant and coating for paper, fabric, etc. The adhesion in all cases, even the adhesion to glass, is excellent.

Example 4

The following example gives a typical formula for the preparation of synthetic rubber:

| | Parts |
|---|---|
| Butadiene | 1137 |
| Acrylonitrile | 502 |
| Vinyl butyl ether | 78 |
| Distilled water | 3500 |
| Potassium oleate | 87.0 |
| Potassium persulfate | 8.75 |
| Ferric citrate (or phosphate) | 8.0 |
| Higher alkyl mercaptan | 5.0 | which are reacted from 7–9 hours at 50° to 55° C., at which time 37 parts of N-phenyl beta naphthyl amine are added, after which unreacted monomers, if any, are stripped from the reaction mass. Precipitation is accomplished by use of an equal volume of 3% sodium chloride: 3% sulfuric acid mixture followed by washing to remove traces of sulfate and chlorides. The product is then dried for 1 to 2 hours at 100° to 110° C., at about 24 inches of mercury. The yield is approximately 90% and the product has a high benzene solubility.

Example 5

The following ingredients were reacted for 24 hours at 65° to 70° C., in a steam-jacketed reactor equipped with stirrer, etc.

| | Parts |
|---|---|
| Dioctyl ester of sodium sulfosuccinic acid | 25 |
| Distilled water | 500 |
| Acrylonitrile | 60 |
| 2-methyl pentadiene-1,3 | 20 |
| Vinyl butyl ether | 20 |
| Potassium persulfate | 0.5 |

The emulsion was precipitated using a 3% hydrochloric acid solution saturated with sodium chloride. The precipitate was washed in boiling water to remove chlorides and then dried in a vacuum oven under 24 inches of mercury at 50° C. An almost theoretical yield of a tough, flexible, vulcanizable copolymer was obtained.

Example 6

Other modifications as to ratios other than in Example 1 may be prepared as follows, using a trace of iron as an activator.

| Specimen | Acrylonitrile | Vinyl Butyl Ether | Butadiene | Copolymer |
|---|---|---|---|---|
| A | 30 | 5 | 65 | Rubbery. |
| B | 29.2 | 53.5 | 17.5 | Elastic, tough |
| C | 75 | 12.5 | 12.5 | Hard, tough. |

What I claim as new and desire to secure by Letters Patent of the United States is:

1. A composition comprising the polymerization product of a mixture comprising 30 to 90 parts of a compound selected from the group consisting of acrylonitrile and methacrylonitrile, 2 to 70 parts of a butadiene-1,3 having the formula

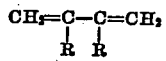

where R is a radical selected from the group consisting of hydrogen, alkyl, aryl, and cycloaliphatic radicals which are free of ethylenic unsaturation, and 2 to 40 parts of a monovinyl ether having the structure $CH_2=CHOR'$ where R' is a hydrocarbon radical having not more than 6 carbon atoms and which is free of ethylenic and acetylenic unsaturation, the major component of said mixture being selected from the group consisting of said acrylonitriles and said butadiene.

2. A composition comprising the polymerization product of a mixture comprising 30 to 90 parts of a compound selected from the group consisting of acrylonitrile and methacrylonitrile, 2 to 70 parts of a butadiene-1,3, having the formula

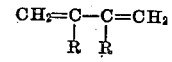

where R is a radical selected from the group consisting of hydrogen, alkyl, aryl, and cycloaliphatic radicals which are free of ethylenic unsaturation, and 2 to 40 parts of a vinyl butyl ether, the major component of said mixture being selected from the group consisting of said acrylonitriles and said butadiene.

3. A rubber-like composition comprising the polymerization product of a mixture comprising 30 to 40 parts of a compound selected from the group consisting of acrylonitrile and methacrylonitrile, 55 to 70 parts of a butadiene-1,3 having the formula

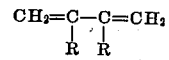

where R is a radical selected from the group consisting of hydrogen, alkyl, aryl, and cycloaliphatic radicals which are free of ethylenic unsaturation and 2 to 10 parts of a monovinyl ether having the structure $CH_2=CHOR'$ where R' is a hydrocarbon radical having not more than 6 carbon atoms and which is free of ethylenic and acetylenic unsaturation.

4. A rubber-like composition comprising the polymerization product of a mixture of 1137 parts of butadiene-1,3, 502 parts acylonitrile and 78 parts of vinyl butyl ether.

5. The product resulting from the vulcanization of the polymerization product of a mixture comprising 30 to 90 parts of a compound selected from the group consisting of acrylonitrile and methacrylonitrile, 2 to 70 parts of a butadiene-1,3 having the formula

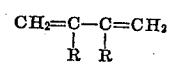

where R is a radical selected from the group consisting of hydrogen, alkyl, aryl, and cycloaliphatic radicals which are free of ethylenic unsaturation, and 2 to 40 parts of a monvinyl ether having the structure $CH_2=CHOR'$ where R' is a hydrocarbon radical having not more than 6 carbon atoms and which is free of ethylenic and acetylenic unsaturation, the major component of said mixture being selected from the group consisting of said acrylonitriles and said butadiene.

6. The product resulting from vulcanization of the polymerization product of a mixture comprising 30 to 40 parts of a compound selected from the group consisting of acrylonitrile and methacrylonitrile, 55 to 70 parts of a butadiene-1,3 having the formula

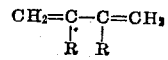

where R is a radical selected from the group consisting of hydrogen, alkyl, aryl, and cycloaliphatic radicals which are free of ethylenic unsaturation, and 2 to 10 parts of a monovinyl ether having the structure $CH_2=CHOR'$ where R' is a hydrocarbon radical having not more than 6 carbon atoms and which is free of ethylenic and acetylenic unsaturation.

7. The product resulting from vulcanization of the polymerization product of a mixture of 1137 parts of butadiene-1,3, 502 parts acrylonitrile, and 78 parts of vinyl butyl ether.

GAETANO F. D'ALELIO.

REFERENCES CITED

The following references are of record in the file of this patent:

UNITED STATES PATENTS

| Number | Name | Date |
|---|---|---|
| 2,066,331 | Carothers et al. | Jan. 5, 1937 |
| 2,232,515 | Arnold et al. | Feb. 18, 1941 |
| 2,234,204 | Starkweather et al. | Mar. 11, 1941 |
| 2,313,233 | Fryling | Mar. 9, 1943 |
| 2,383,055 | Fryling | Aug. 21, 1945 |

OTHER REFERENCES

Barron, Modern Synthetic Rubbers, published by Van Nostrand, N. Y. 1944, page 146.